(12) United States Patent
Abdolvand et al.

(10) Patent No.: US 12,197,001 B2
(45) Date of Patent: Jan. 14, 2025

(54) HOLLOW CORE FIBER LIGHT SOURCE AND A METHOD FOR MANUFACTURING A HOLLOW CORE FIBER

(71) Applicant: ASML NETHERLANDS B.V., Veldhoven (NL)

(72) Inventors: Amir Abdolvand, Eindhoven (NL); Cristian Bogdan Craus, Helmond (NL); Sebastian Thomas Bauerschmidt, Wendelstein (DE)

(73) Assignee: ASML NETHERLANDS B.V., Veldhoven (NL)

( * ) Notice: Subject to any disclaimer, the term of this patent is extended or adjusted under 35 U.S.C. 154(b) by 185 days.

(21) Appl. No.: 18/017,059

(22) PCT Filed: Jul. 12, 2021

(86) PCT No.: PCT/EP2021/069252
§ 371 (c)(1),
(2) Date: Jan. 19, 2023

(87) PCT Pub. No.: WO2022/028812
PCT Pub. Date: Feb. 10, 2022

(65) Prior Publication Data
US 2023/0296829 A1 Sep. 21, 2023

(30) Foreign Application Priority Data

Aug. 6, 2020 (EP) ..................................... 20189800
Nov. 13, 2020 (EP) ..................................... 20207371

(51) Int. Cl.
*G02B 6/032* (2006.01)
*G02B 6/02* (2006.01)
*G02B 6/25* (2006.01)

(52) U.S. Cl.
CPC ......... *G02B 6/032* (2013.01); *G02B 6/02328* (2013.01); *G02B 6/25* (2013.01); *G02B 2006/0325* (2013.01)

(58) Field of Classification Search
CPC ... G02B 6/02328; G02B 6/032; G02B 6/1228
See application file for complete search history.

(56) References Cited

U.S. PATENT DOCUMENTS 6,961,116 B2   11/2005   Den Boef et al.
9,160,137 B1   10/2015   Abdolvand et al.
(Continued)

FOREIGN PATENT DOCUMENTS

EP   1628164   2/2006
EP   3404454   11/2018
(Continued)

OTHER PUBLICATIONS

International Search Report and Written Opinion issued in PCT Patent Application No. PCT/EP2021/069252, dated Sep. 23, 2021.
(Continued)

*Primary Examiner* — Rhonda S Peace
(74) *Attorney, Agent, or Firm* — Pillsbury Winthrop Shaw Pittman, LLP

(57) ABSTRACT

A method of processing an out-coupling end of a hollow core fiber including a plurality of anti-resonance elements surrounding a hollow core, and a hollow core fiber having been so processed. The method may include performing a tapering step to form a taper in the anti-resonance elements; performing a cleaving step at the taper to form at least one tapered out-coupling end of the hollow core fiber; and performing an end processing step including further heating the out-coupling end in a controlled manner to smoothen the out-coupling end.

20 Claims, 6 Drawing Sheets

(56) References Cited

U.S. PATENT DOCUMENTS

| | | | |
|---|---|---|---|
| 10,393,956 B2* | 8/2019 | Russell | G02B 6/02371 |
| 11,029,464 B2* | 6/2021 | Bauerschmidt | G02B 6/2552 |
| 11,999,645 B2* | 6/2024 | Van Leeuwen | G03F 7/70316 |
| 12,050,392 B2* | 7/2024 | Brussaard | G02B 6/02328 |
| 2004/0015085 A1 | 1/2004 | Soh et al. | |
| 2009/0195768 A1 | 8/2009 | Bijnen et al. | |
| 2010/0328655 A1 | 12/2010 | Den Boef | |
| 2011/0026032 A1 | 2/2011 | Den Boef et al. | |
| 2011/0102753 A1 | 5/2011 | Van De Kerkhof et al. | |
| 2011/0249244 A1 | 10/2011 | Leewis et al. | |
| 2011/0273712 A1* | 11/2011 | Digonnet | G02B 6/02376 385/12 |
| 2012/0044470 A1 | 2/2012 | Smilde et al. | |
| 2015/0261097 A1 | 9/2015 | Mathijssen et al. | |
| 2016/0161863 A1 | 6/2016 | Den Boef et al. | |
| 2016/0370717 A1 | 12/2016 | Den Boef et al. | |
| 2020/0166699 A1* | 5/2020 | Bauerschmidt | G02B 6/02304 |
| 2020/0319400 A1* | 10/2020 | Uebel | G02B 6/50 |
| 2021/0141150 A1* | 5/2021 | Sabert | G02B 6/02328 |
| 2021/0387892 A1* | 12/2021 | Van Leeuwen | G03F 7/70616 |
| 2023/0296829 A1* | 9/2023 | Abdolvand | G02B 6/032 385/125 |

FOREIGN PATENT DOCUMENTS

| | | |
|---|---|---|
| EP | 3812807 | 4/2021 |
| EP | 3819267 | 5/2021 |
| TW | 201901206 | 1/2019 |
| WO | 2017/032454 | 3/2017 |
| WO | 2018/127266 | 7/2018 |

OTHER PUBLICATIONS

T.A. Laurence et al., "Metallic-like photoluminescence and absorption in fused silica surface flaws", Applied Physics Letters, 94, 151114, pp. 93-96 (2009).

S. Berg-Johansen et al., "Classically entangled optical beams for high-speed kinematic sensing", Optica, vol. 2, No. 10, pp. 864-868 (2015).

Communication issued in European Patent Application No. 20201771.4, dated Mar. 10, 2021.

* cited by examiner

HOLLOW CORE FIBER LIGHT SOURCE AND A METHOD FOR MANUFACTURING A HOLLOW CORE FIBER

CROSS REFERENCE TO RELATED APPLICATIONS

This application is the U.S. national phase entry of PCT patent application no. PCT/EP2021/069252 which was filed on Jul. 12, 2021, which claims priority of European patent application No. 20189800.4 which was filed on Aug. 6, 2020 and of European patent application No. 20207371.4 which was filed on Nov. 13, 2020 and which are incorporated herein in their entireties by reference.

FIELD

The present invention relates to a light source and a method for operating the light source, in particular, a broadband light source for use in a lithographic apparatus or metrology tools.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda / NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low $k_1$.

A metrology apparatus can be used to measure parameters of interest of structures on the substrate. For example, a metrology apparatus can be used to measure parameters such as critical dimension, overlay between layers on the substrate and asymmetry of a pattern on the substrate. Rays of measurement radiation are used to illuminate the substrate. The radiation is diffracted by the structure on the substrate. The diffracted radiation is collected by an objective lens and captured by a sensor.

The rays of measurement radiation are provided by light emitted by a light source. This light is directed onto the substrate via a beam splitter and the objective lens that collects the diffracted radiation from the substrate.

The light source providing measurement radiation may be a broadband light source. The broadband light source may be generated using a gas-filled optical fiber. A laser source may be coupled to the input of the optical fiber of the light source, and be spectrally broadened in the optical fiber.

SUMMARY

Both very high spectral power density of such a light source and plasma generated as a by-product of light generation bear a risk of damaging the material of a hollow core photonic crystal fiber (HC-PCF). Thus, it is desirable, for example, to provide a broadband light source that has an increased operable lifetime. In particular, it is desirable to provide a broadband light source comprising a gas-filled hollow-core photonic crystal fiber that produces less contaminant material during operation.

According to a first aspect, there is provided a method of processing an out-coupling end of a hollow core fiber comprising a plurality of anti-resonance elements surrounding a hollow core, comprising: performing a tapering step to form a taper in the anti-resonance elements; performing a cleaving step at said taper to form at least one tapered out-coupling end of the hollow core fiber; and performing an end processing step comprising further heating the out-coupling end in a controlled manner to smoothen the out-coupling end.

According to a second aspect of the invention, there is provided a hollow core fiber comprising: a plurality of anti-resonance elements surrounding a hollow core; an outer jacket surrounding the anti-resonance elements; an in-coupling end having a first tapered region; and an out-coupling end having a second tapered region; wherein the anti-resonance elements at the out-coupling end are substantially collapsed; and the out-coupling end is substantially smoothed such that an inner rim and/or outer rim of the jacket comprises a rounded profile at the out-coupling end.

BRIEF DESCRIPTION OF THE DRAWINGS

Embodiments of the invention will now be described, by way of example only, with reference to the accompanying schematic drawings, in which.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1A:
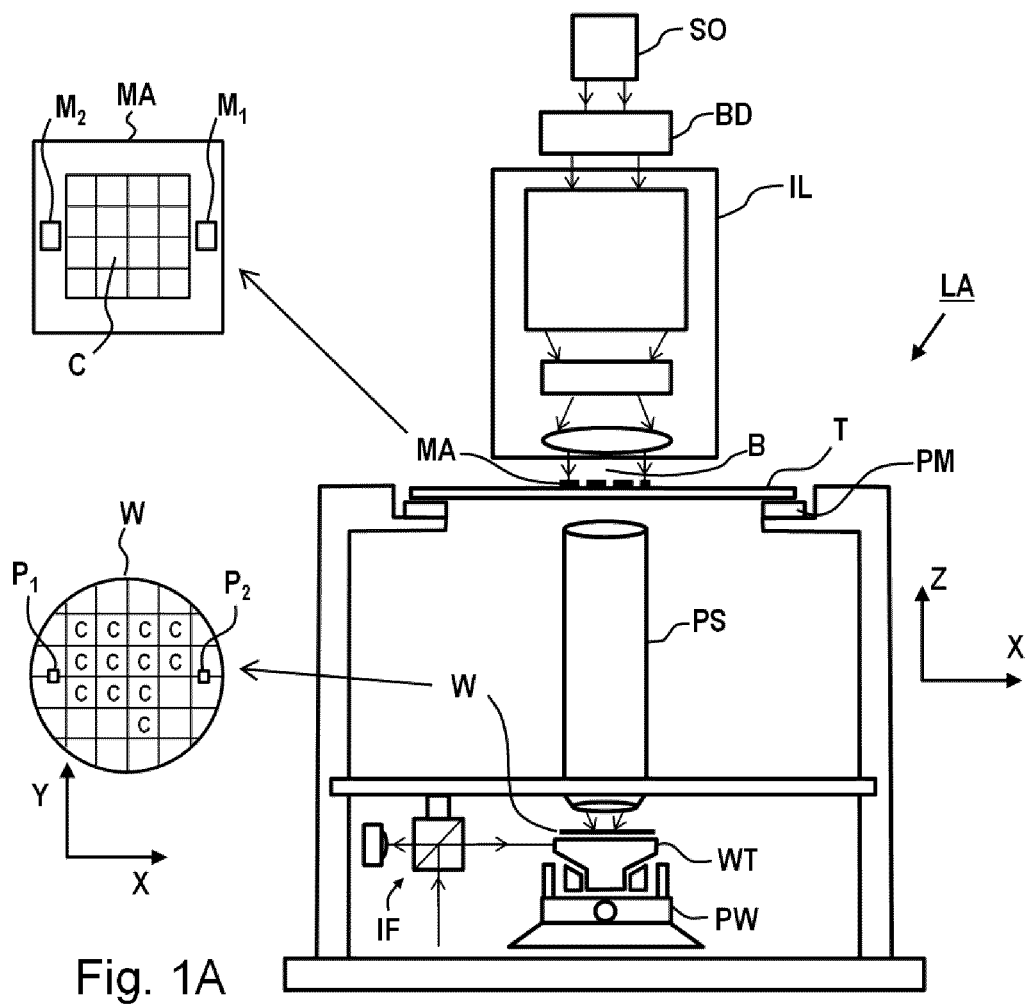
FIG. 1A depicts a schematic overview of lithographic apparatus.

FIG. 1A schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1A) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 1B:
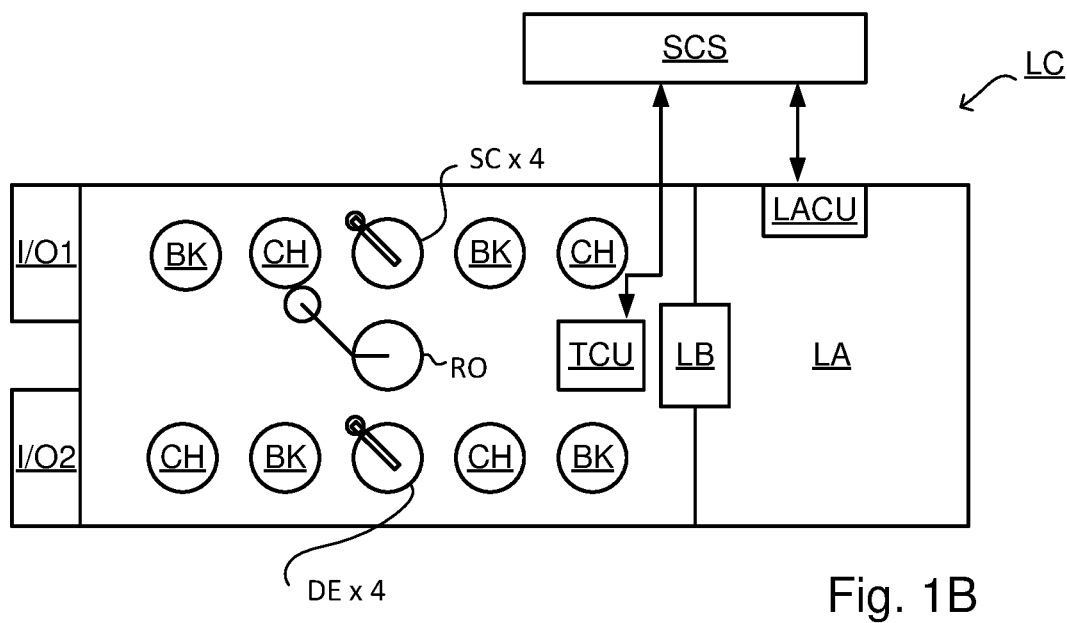
FIG. 1B depicts a schematic overview of a lithographic cell.

As shown in FIG. 1B the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 2:
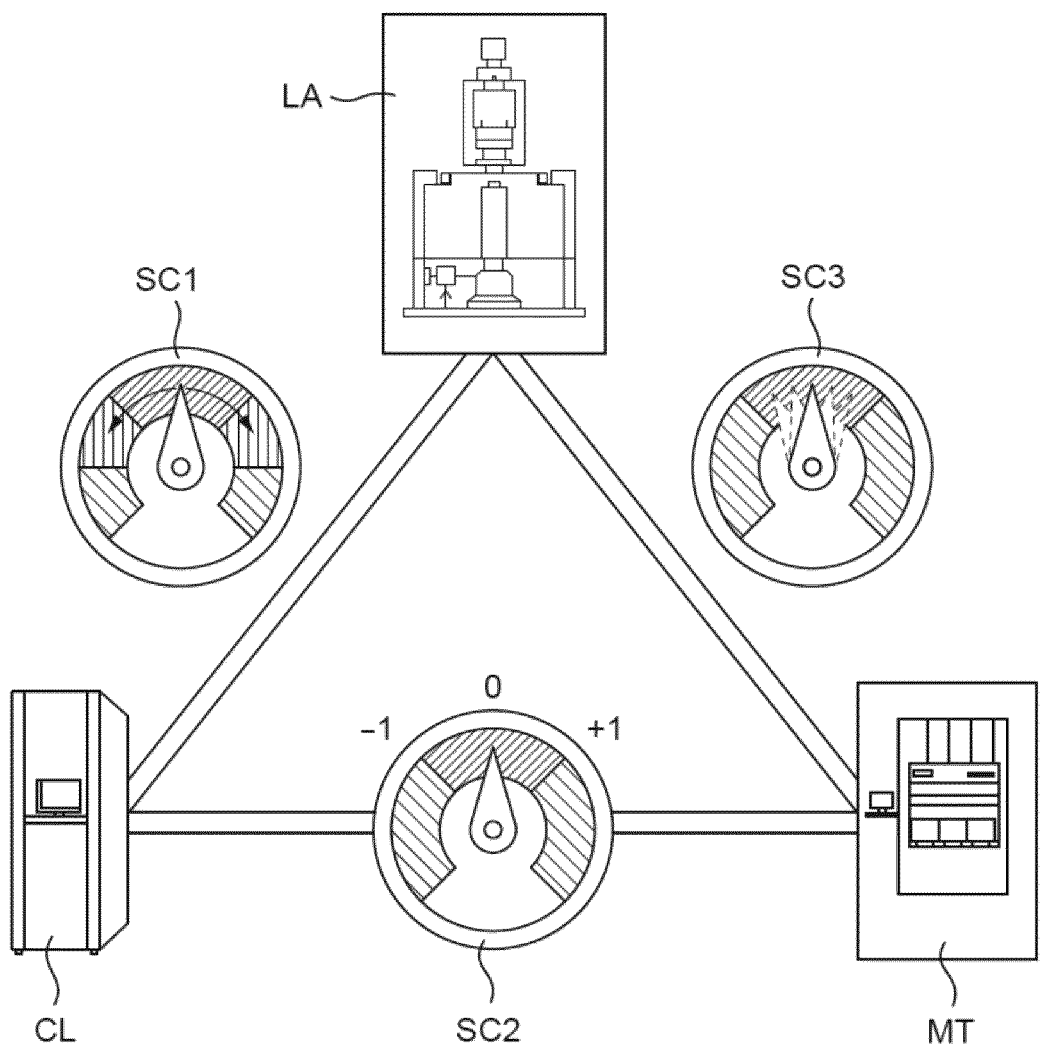
FIG. 2 depicts a schematic representation of holistic lithography, representing a cooperation between three key technologies to optimize semiconductor manufacturing.

Typically the patterning process in a lithographic apparatus LA is one of the most critical steps in the processing which requires high accuracy of dimensioning and placement of structures on the substrate W. To ensure this high accuracy, three systems may be combined in a so called "holistic" control environment as schematically depicted in FIG. 2. One of these systems is the lithographic apparatus LA which is (virtually) connected to a metrology tool MT (a second system) and to a computer system CL (a third system). The key of such "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 2 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 2 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 2 by the multiple arrows in the third scale SC3).

In lithographic processes, it is desirable to make frequently measurements of the structures created, e.g., for process control and verification. Different types of metrology apparatus MT for making such measurements are known, including scanning electron microscopes or various forms of scatterometer metrology apparatus MT.

Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers may measure gratings using light from embodiment of light sources that are discussed in this document.

Overall measurement quality of a lithographic parameter using a specific target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application US2016-0161863 and published US patent application US 2016/0370717A1 incorporated herein by reference in its entirety. The light sources of this document may be configured to be controllable in respect to the light source requirements of these substrate measurement recipes.

A lithographic apparatus may include one or more (e.g. a plurality of) alignment sensors by which positions of alignment marks provided on a substrate can be measured accurately. Alignment (or position) sensors may use optical phenomena such as diffraction and interference to obtain position information from alignment marks formed on the substrate. An example of an alignment sensor used in current lithographic apparatus is based on a self-referencing interferometer as described in U.S. Pat. No. 6,961,116. Various enhancements and modifications of the position sensor have been developed, for example as disclosed in US2015261097A1. The contents of all of these publications are incorporated herein by reference.

A mark, or alignment mark, may comprise a series of bars formed on or in a layer provided on the substrate or formed (directly) in the substrate. The bars may be regularly spaced and act as grating lines so that the mark can be regarded as a diffraction grating with a well-known spatial period (pitch). Depending on the orientation of these grating lines, a mark may be designed to allow measurement of a position along the X axis, or along the Y axis (which is oriented substantially perpendicular to the X axis). A mark comprising bars that are arranged at +45 degrees and/or −45 degrees with respect to both the X- and Y-axes allows for a combined X- and Y-measurement using techniques as described in US2009/195768A, which is incorporated by reference.

The alignment sensor scans each mark optically with a spot of radiation to obtain a periodically varying signal, such as a sine wave. The phase of this signal is analyzed, to determine the position of the mark and, hence, of the substrate relative to the alignment sensor, which, in turn, is fixated relative to a reference frame of a lithographic apparatus. So-called coarse and fine marks may be provided, related to different (coarse and fine) mark dimensions, so that the alignment sensor can distinguish between different cycles of the periodic signal, as well as the exact position (phase) within a cycle. Marks of different pitches may also be used for this purpose.

Measuring the position of the marks may also provide information on a deformation of the substrate on which the marks are provided, for example in the form of a wafer grid. Deformation of the substrate may occur by, for example, electrostatic clamping of the substrate to the substrate table and/or heating of the substrate when the substrate is exposed to radiation.

Figure 3A:
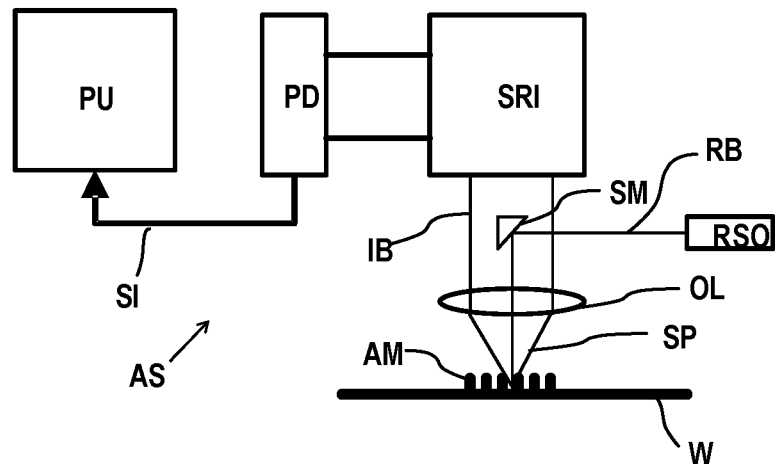
FIG. 3A depicts a schematic block diagram of an alignment sensor.

FIG. 3A is a schematic block diagram of an embodiment of a known alignment sensor AS, such as is described, for example, in U.S. Pat. No. 6,961,116, and which is incorporated by reference. Radiation source RSO provides a beam RB of radiation of one or more wavelengths, which is diverted by diverting optics onto a mark, such as mark AM located on substrate W, as an illumination spot SP. In this example the diverting optics comprises a spot mirror SM and an objective lens OL. The radiation source RSO may be provided by embodiments of the light source of the disclosure of this document. The illumination spot SP, by which the mark AM is illuminated, may be slightly smaller in diameter than the width of the mark itself.

Radiation diffracted by the mark AM is collimated (in this example via the objective lens OL) into an information-carrying beam IB. The term "diffracted" is intended to include zero-order diffraction from the mark (which may be referred to as reflection). A self-referencing interferometer SRI, e.g. of the type disclosed in U.S. Pat. No. 6,961,116 mentioned above, interferes the beam IB with itself after which the beam is received by a photodetector PD. Additional optics (not shown) may be included to provide separate beams in case more than one wavelength is created by the radiation source RSO. The photodetector may be a single element, or it may comprise a number of pixels, if desired. The photodetector may comprise a sensor array.

A topography measurement system, level sensor or height sensor, and which may be integrated in the lithographic apparatus, is arranged to measure a topography of a top surface of a substrate (or wafer). A map of the topography of the substrate, also referred to as height map, may be generated from these measurements indicating a height of the substrate as a function of the position on the substrate. This height map may subsequently be used to correct the position of the substrate during transfer of the pattern on the substrate, in order to provide an aerial image of the patterning device in a properly focus position on the substrate. It will be understood that "height" in this context refers to a dimension broadly out of the plane to the substrate (also referred to as Z-axis). Typically, the level or height sensor performs measurements at a fixed location (relative to its own optical system) and a relative movement between the substrate and the optical system of the level or height sensor results in height measurements at locations across the substrate.

Figure 3B:
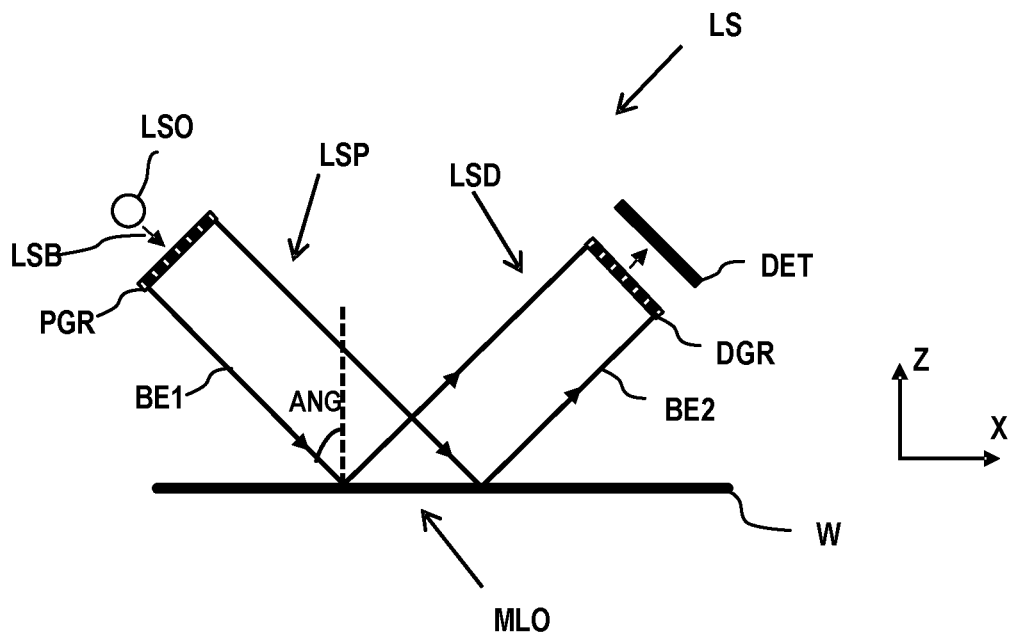
FIG. 3B depicts a schematic block diagram of a level sensor.

An example of a level or height sensor LS as known in the art is schematically shown in FIG. 3B, which illustrates only the principles of operation. In this example, the level sensor comprises an optical system, which includes a projection unit LSP and a detection unit LSD. The projection unit LSP comprises a radiation source LSO providing a beam of radiation LSB which is imparted by a projection grating PGR of the projection unit LSP. The radiation source LSO may comprise an embodiment of the disclosure of this document.

The present disclosure is directed towards improving the operable lifetime of a light source, in particular, the operable lifetime of a broadband light source comprising a hollow-core photonic crystal fiber (HC-PCF). The broadband light source of the present disclosure may be used in metrology tools such as scatterometers alignment sensors, height or level sensors as described above.

Metrology tools MT, such as a scatterometer, topography measurement system, or position measurement system mentioned above may use radiation originating from a radiation source to perform a measurement. The properties of the radiation used by a metrology tool may affect the type and quality of measurements that may be performed. For some applications, it may be advantageous to use multiple radiation frequencies to measure a substrate, for example broadband radiation may be used. Multiple different frequencies may be able to propagate, irradiate, and scatter off a metrology target with no or minimal interference with other frequencies. Therefore different frequencies may for example be used to obtain more metrology data simultaneously. Different radiation frequencies may also be able to interrogate and discover different properties of a metrology target. Broadband radiation may be useful in metrology systems MT such as for example level sensors, alignment mark measurement systems, scatterometry tools, or inspection tools. A broadband radiation source may be a supercontinuum source.

High quality broadband radiation, for example supercontinuum radiation, may be difficult to generate. One method for generating broadband radiation may be to broaden high-power narrow band or single frequency input radiation, for example making use of non-linear, higher order effects. The input radiation (which may be produced using a laser) may be referred to as pump radiation. Alternatively, the input radiation may be referred to as seed radiation. To obtain high power radiation for broadening effects, radiation may be confined into a small area so that strongly localised high intensity radiation is achieved. In those areas, the radiation may interact with broadening structures and/or materials forming a non-linear medium so as to create broadband output radiation. In the high intensity radiation areas, different materials and/or structures may be used to enable and/or improve radiation broadening by providing a suitable non-linear medium.

In some implementations, the broadband output radiation is created in a photonic crystal fiber (PCF). In several embodiments, such a photonic crystal fiber has microstructures around its fiber core assisting in confining radiation that travels through the fiber in the fiber core. The fiber core can be made of a solid material that has non-linear properties and that is capable of generating broadband radiation when high intensity pump radiation is transmitted through the fiber core. Although it is feasible to generate broadband radiation in solid core photonic crystal fibers, there may be a few disadvantages of using a solid material. For example, if UV radiation is generated in the solid core, this radiation might not be present in the output spectrum of the fiber because the radiation is absorbed by most solid material.

In some implementations, as discussed further below with reference to FIG. 4B, methods and apparatus for broadening input radiation may use a fiber for confining input radiation, and for broadening the input radiation to output broadband radiation. The fiber may be a hollow core fiber, and may comprise internal structures to achieve effective guiding and confinement of radiation in the fiber. The fiber may be a hollow core photonic crystal fiber (HC-PCF), which is particularly suitable for strong radiation confinement, predominantly inside the hollow core of the fiber, achieving high radiation intensities. The hollow core of the fiber may be filled with a gas or gas mixture acting as a broadening medium for broadening input radiation. Such a fiber and gas mixture arrangement may be used to create a supercontinuum radiation source. Radiation input to the fiber may be electromagnetic radiation, for example radiation in one or more of the infrared, visible, UV, and extreme UV spectra. The output radiation may consist of or comprise broadband radiation, which may be referred to herein as white light. The output radiation may cover UV, visible and near-infrared range. The exact spectrum and power density of the output radiation will be determined by plurality of parameters, such as fiber structure, gas mix composition, gas pressure, energy of the input radiation, pulse duration and pulse shape of the input radiation.

Some embodiments relate to a new design of such a broadband radiation source comprising an optical fiber. The optical fiber is a hollow-core, photonic crystal fiber (HC-PCF). In particular, the optical fiber may be a hollow-core, photonic crystal fiber of a type comprising anti-resonant structures for confinement of radiation. Such fibers comprising anti-resonant structures are known in the art as anti-resonant fibers, tubular fibers, single-ring fibers, negative curvature fibers or inhibited coupling fibers. Various different designs of such fibers are known in the art. Alternatively, the optical fiber may be photonic bandgap fibers (HC-PBFs, for example a Kagome fiber).

Figure 4A:
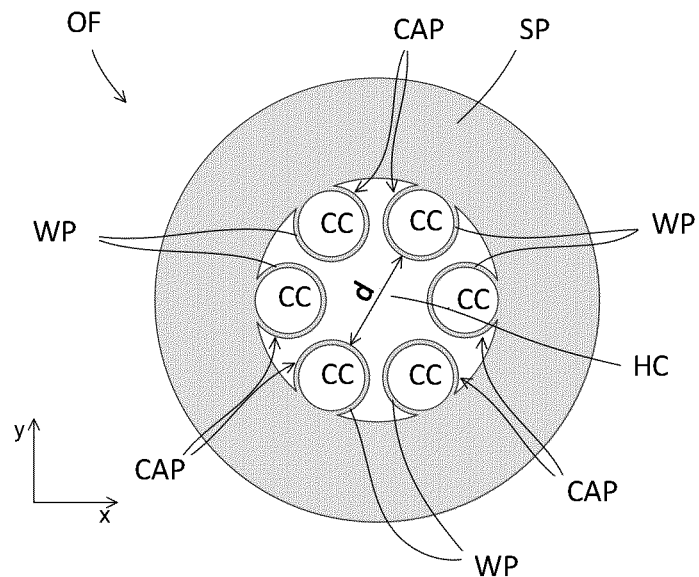
FIG. 4A is a schematic cross sectional view of a hollow core optical fiber that may form part of a radiation source according to an embodiment in a transverse plane (i.e. perpendicular to an axis of the optical fiber)

A number of types of HC-PCFs can be engineered, each based on a different physical guidance mechanism. Two such HC-PCFs include: hollow-core photonic bandgap fibers (HC-PBFs) and hollow-core anti-resonant reflecting fibers (HC-ARFs). Detail on the design and manufacture of HC-PCFs can be found in US patent US2004/015085A1 (for HC-PBFs) and International PCT patent application WO2017/032454A1 (for Hollow Core anti-resonant reflecting fibers), which are incorporated herein by reference. FIG. 4C(a) shows a Kagome fiber, comprising a Kagome lattice structure.

An example of an optical fiber for use in the radiation source is now described with reference to FIG. 4A, which is a schematic cross sectional view of the optical fiber OF in a transverse plane. Further embodiments similar to the practical example of the fiber of FIG. 4A are disclosed in WO2017/032454A1.

The optical fiber OF comprises an elongate body, which is longer in one dimension compared to the other two dimensions of the fiber OF. This longer dimension may be referred to as an axial direction and may define an axis of the optical fiber OF. The two other dimensions define a plane which may be referred to as a transverse plane. FIG. 4A shows a cross-section of the optical fiber OF in this transverse plane (i.e. perpendicular to the axis), which is labelled as the x-y plane. The transverse cross-section of the optical fiber OF may be substantially constant along the fiber axis.

It will be appreciated that the optical fiber OF has some degree of flexibility and therefore the direction of the axis will not, in general, be uniform along the length of the optical fiber OF. The terms such as the optical axis, the transverse cross-section and the like will be understood to mean the local optical axis, the local transverse cross-section and so on. Furthermore, where components are described as being cylindrical or tubular these terms will be understood to encompass such shapes that may have been distorted as the optical fiber OF is flexed.

The optical fiber OF may have any length and it will be appreciated that the length of the optical fiber OF may be dependent on the application. The optical fiber OF may have a length between 1 cm and 10 m, or 0.1 cm and 10 m for example, the optical fiber OF may have a length between 10 cm and 100 cm.

The optical fiber OF comprises: a hollow core COR; a cladding portion surrounding the hollow core COR; and a support portion SP surrounding and supporting the cladding portion. The optical fiber OF may be considered to comprise a body (comprising the cladding portion and the support portion SP) having a hollow core COR. The cladding portion comprises a plurality of anti-resonance elements for guiding radiation through the hollow core COR. In particular, the plurality of anti-resonance elements are arranged to confine radiation that propagates through the optical fiber OF predominantly inside the hollow core HC and to guide the radiation along the optical fiber OF. The hollow core HC of the optical fiber OF may be disposed substantially in a central region of the optical fiber OF, so that the axis of the optical fiber OF may also define an axis of the hollow core HC of the optical fiber OF.

The cladding portion comprises a plurality of anti-resonance elements for guiding radiation propagating through the optical fiber OF. In particular, in this embodiment, the cladding portion comprises a single ring of six tubular capillaries CAP. Each of the tubular capillaries CAP acts as an anti-resonance element.

The capillaries CAP may also be referred to as tubes. The capillaries CAP may be circular in cross section, or may have another shape. Each capillary CAP comprises a generally cylindrical wall portion WP that at least partially defines the hollow core HC of the optical fiber OF and separates the hollow core HC from a capillary cavity CC. It will be appreciated that the wall portion WP may act as an anti-reflecting Fabry-Perot resonator for radiation that propagates through the hollow core HC (and which may be incident on the wall portion WP at a grazing incidence angle). The thickness of the wall portion WP may be suitable so as to ensure that reflection back into the hollow core HC is generally enhanced whereas transmission into the capillary cavity CC is generally suppressed. In some embodiments, the capillary wall portion WP may have a thickness between 0.01-10.0 μm.

It will be appreciated that, as used herein, the term cladding portion is intended to mean a portion of the optical fiber OF for guiding radiation propagating through the optical fiber OF (i.e. the capillaries CAP which confine said radiation within the hollow core COR). The radiation may be confined in the form of transverse modes, propagating along the fiber axis.

The support portion is generally tubular and supports the six capillaries CAP of the cladding portion. The six capillaries CAP are distributed evenly around an inner surface if the inner support portion SP. The six capillaries CAP may be described as being disposed in a generally hexagonal formation.

The capillaries CAP are arranged so that each capillary is not in contact with any of the other capillaries CAP. Each of the capillaries CAP is in contact with the inner support portion SP and spaced apart from adjacent capillaries CAP in the ring structure. Such an arrangement may be beneficial since it may increase a transmission bandwidth of the optical fiber OF (relative, for example, to an arrangement wherein the capillaries are in contact with each other). Alternatively, in some embodiments, each of the capillaries CAP may be in contact with adjacent capillaries CAP in the ring structure.

The six capillaries CAP of the cladding portion are disposed in a ring structure around the hollow core COR. An inner surface of the ring structure of capillaries CAP at least partially defines the hollow core HC of the optical fiber OF. The diameter d of the hollow core HC (which may be defined as the smallest dimension between opposed capillaries, indicated by arrow d) may be between 10 and 1000 μm. The diameter d of the hollow core HC may affect the mode field diameter, impact loss, dispersion, modal plurality, and non-linearity properties of the hollow core optical fiber OF.

In this embodiment, the cladding portion comprises a single ring arrangement of capillaries CAP (which act as anti-resonance elements). Therefore, a line in any radial direction from a center of the hollow core HC to an exterior of the optical fiber OF passes through no more than one capillary CAP.

It will be appreciated that other embodiments may be provided with different arrangements of anti-resonance elements. These may include arrangements having multiple rings of anti-resonance elements and arrangements having nested anti-resonance elements. Furthermore, although the embodiment shown in FIG. 4A comprises a ring of six capillaries, in other embodiments, one or more rings comprising any number of anti-resonance elements (for example 4, 5, 6, 7, 8, 9, 10, 11 or 12 capillaries) may be provided in the cladding portion.

FIG. 4C(b) shows a modified embodiment of the above discussed HC-PCFs with a single ring of tubular capillaries. In the example of FIG. 4C(b) there are two coaxial rings of tubular capillaries 21. For holding the inner and outer rings of tubular capillaries 21, a support tube ST may be included in the HC-PCF. The support tube may be made of silica.

The tubular capillaries of the examples of FIG. 4A and FIGS. 4C (a) and (b) may have a circular cross-sectional shape. Other shapes are also possible for the tubular capillaries, like elliptical or polygonal cross-sections. Additionally, the solid material of the tubular capillaries of the examples of FIG. 4A and FIGS. 4C (a) and (b) may comprise plastic material, like PMA, glass, like silica, or soft glass.

Figure 4B:
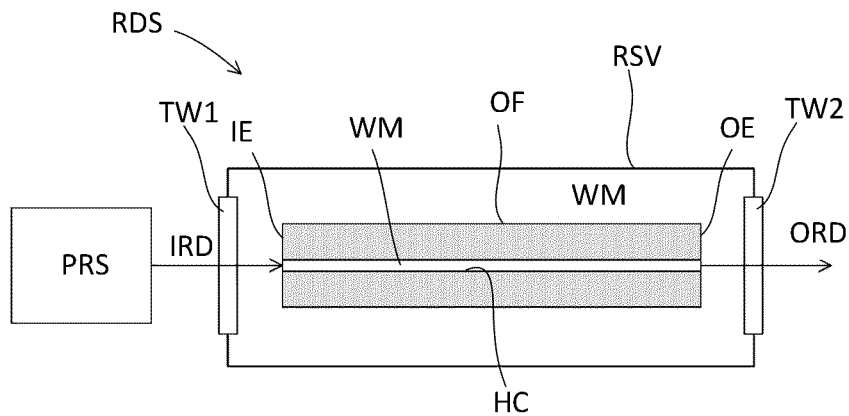
FIG. 4B depicts a schematic representation of a radiation source according to an embodiment for providing broadband output radiation.
Figure 4C:
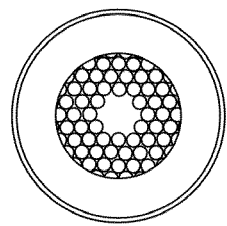
FIGS. 4C (a) and (b) schematically depict the transverse cross-sections of examples of hollow core photonic crystal fiber (HC-PCF) designs for supercontinuum generation, which each may form part of a radiation source according to an embodiment.
Figure 4C:
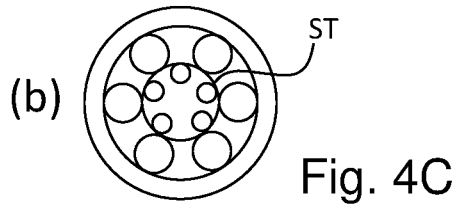

FIG. 4B depicts a radiation source RDS for providing broadband output radiation. The radiation source RDS comprises a pulsed pump radiation source PRS or any other type of source that is capable of generating short pulses of a desired length and energy level; an optical fiber OF (for example of the type shown in FIG. 4A) with a hollow core COR; and a working medium WM (for example a gas) disposed within the hollow core COR. Although in FIG. 4B the radiation source RDS comprises the optical fiber OF shown in FIG. 4A, in alternative embodiments other types of hollow core optical fiber may be used.

The pulsed pump radiation source PRS is configured to provide input radiation IRD. The hollow core HC of the optical fiber OF is arranged to receive the input radiation IRD from the pulsed pump radiation source PRS, and broaden it to provide output radiation ORD. The working medium WM enables the broadening of the frequency range of the received input radiation IRD so as to provide broadband output radiation ORD.

The radiation source RDS further comprises a reservoir RSV. The optical fiber OF is disposed inside the reservoir RSV. The reservoir RSV may also be referred to as a housing, container or gas cell. The reservoir RSV is configured to contain the working medium WM. The reservoir RSV may comprise one or more features, known in the art, for controlling, regulating, and/or monitoring the composition of the working medium WM (which may be a gas) inside the reservoir RSV. The reservoir RSV may comprise a first transparent window TW1. In use, the optical fiber OF is disposed inside the reservoir RSV such that the first transparent window TW1 is located proximate to an input end IE of the optical fiber OF. The first transparent window TW1 may form part of a wall of the reservoir RSV. The first transparent window TW1 may be transparent for at least the received input radiation frequencies, so that received input radiation IRD (or at least a large portion thereof) may be coupled into the optical fiber OF located inside reservoir RSV. It will be appreciated that optics (not shown) may be provided for coupling the input radiation IRD into the optical fiber OF.

The reservoir RSV comprises a second transparent window TW2, forming part of a wall of the reservoir RSV. In use, when the optical fiber OF is disposed inside the reservoir RSV, the second transparent window TW2 is located proximate to an output end OE of the optical fiber OF. The second transparent window TW2 may be transparent for at least the frequencies of the broadband output radiation ORD of the apparatus.

Alternatively, in another embodiment, the two opposed ends of the optical fiber OF may be placed inside different reservoirs. The optical fiber OF may comprise a first end section configured to receive input radiation IRD, and a second end section for outputting broadband output radiation ORD. The first end section may be placed inside a first reservoir, comprising a working medium WM. The second end section may be placed inside a second reservoir, wherein the second reservoir may also comprise a working medium WM. The functioning of the reservoirs may be as described in relation to FIG. 4B above. The first reservoir may comprise a first transparent window, configured to be transparent for input radiation IRD. The second reservoir may comprise a second transparent window configured to be transparent for broadband output broadband radiation ORD. The first and second reservoirs may also comprise a sealable opening to permit the optical fiber OF to be placed partially inside and partially outside the reservoir, so that a gas can be sealed inside the reservoir. The optical fiber OF may further comprise a middle section not contained inside a reservoir. Such an arrangement using two separate gas reservoirs may be particularly convenient for embodiments wherein the optical fiber OF is relatively long (for example when the length is more than 1 m). It will be appreciated that for such arrangements which use two separate gas reservoirs, the two reservoirs (which may comprise one or more features, known in the art, for controlling, regulating, and/or monitoring the composition of a gas inside the two reservoirs) may be considered to provide an apparatus for providing the working medium WM within the hollow core HC of the optical fiber OF.

In this context a window may be transparent for a frequency if at least 50%, 75%, 85%, 90%, 95%, or 99% of incident radiation of that frequency on the window is transmitted through the window.

Both the first TW1 and the second TW2 transparent windows may form an airtight seal within the walls of the reservoir RSV so that the working medium WM (which may be a gas) may be contained within the reservoir RSV. It will be appreciated that the gas WM may be contained within the reservoir RSV at a pressure different to the ambient pressure of the reservoir RSV.

The working medium WM may comprise a noble gas such as Argon, Krypton, and Xenon, a Raman active gas such as Hydrogen, Deuterium and Nitrogen, or a gas mixture such as an Argon/Hydrogen mixture, a Xenon/Deuterium mixture, a Krypton/Nitrogen mixture, Krypton/Helium, or a Nitrogen/Hydrogen mixture. Depending on the type of filling gas, the nonlinear optical processes can include modulational instability (MI), soliton self-compression, soliton fission, Kerr effect, Raman effect and dispersive wave generation, details of which are described in WO2018/127266A1 and U.S. Pat. No. 9,160,137B1 (both of which are hereby incorporated by reference). Since the dispersion of the filling gas can be tuned by varying the working medium WM pressure in the reservoir RSR (i.e. gas cell pressure), the generated broadband pulse dynamics and the associated spectral broadening characteristics can be adjusted so as to optimize the frequency conversion.

In one implementation, the working medium WM may be disposed within the hollow core HC at least during receipt of input radiation IRD for producing broadband output radiation ORD. It will be appreciated that, while the optical fiber OF is not receiving input radiation IRD for producing broadband output radiation, the gas WM may be wholly or partially absent from the hollow core COR.

In order to achieve frequency broadening high intensity radiation may be desirable. An advantage of having a hollow core optical fiber OF is that it may achieve high intensity radiation through strong spatial confinement of radiation propagating through the optical fiber OF, achieving high localised radiation intensities. The radiation intensity inside the optical fiber OF may be high, for example due to high received input radiation intensity and/or due to strong spatial confinement of the radiation inside the optical fiber OF. An advantage of hollow core optical fibers is that they can guide radiation having a broader wavelength range that solid-core fibers and, in particular, hollow core optical fibers can guide radiation in both the ultraviolet and infrared ranges.

An advantage of using a hollow core optical fiber OF may be that the majority of the radiation guided inside the optical fiber OF is confined to the hollow core COR. Therefore, the majority of the interaction of the radiation inside the optical fiber OF is with the working medium WM, which is provided inside the hollow core HC of the optical fiber OF. As a result, the broadening effects of the working medium WM on the radiation may be increased.

The received input radiation IRD may be electromagnetic radiation. The input radiation IRD may be received as pulsed radiation. For example, the input radiation IRD may comprise ultrafast pulses, for example, generated by a laser.

The input radiation IRD may be coherent radiation. The input radiation IRD may be collimated radiation, an advantage of which may be to facilitate and improve the efficiency of coupling the input radiation IRD into the optical fiber OF. The input radiation IRD may comprise a single frequency, or a narrow range of frequencies. The input radiation IRD may be generated by a laser. Similarly, the output radiation ORD may be collimated and/or may be coherent.

The broadband range of the output radiation ORD may be a continuous range, comprising a continuous range of radiation frequencies. The output radiation ORD may comprise supercontinuum radiation. Continuous radiation may be beneficial for use in a number of applications, for example in metrology applications. For example, the continuous range of frequencies may be used to interrogate a large number of properties. The continuous range of frequencies may for example be used to determine and/or eliminate a frequency dependency of a measured property. Supercontinuum output radiation ORD may comprise for example electromagnetic radiation over a wavelength range of 100 nm-4000 nm, or even up to 10 μm. The broadband output radiation ORD frequency range may be for example 400 nm-900 nm, 500 nm-900 nm, or 200 nm-2000 nm. The supercontinuum output radiation ORD may comprise white light.

The input radiation IRD provided by the pulsed pump radiation source PRS may be pulsed. The input radiation IRD may comprise electromagnetic radiation of one or more frequencies between 200 nm and 2 μm. The input radiation IRD may for example comprise electromagnetic radiation with a wavelength of 1.03 μm. The repetition rate of the pulsed radiation IRD may be of an order of magnitude of 1 kHz to 100 MHz. The pulse energies may have an order of magnitude of 0.1 μJ to 100 μJ, for example 1-10 μJ. A pulse duration for the input radiation IRD may be between 10 fs and 10 ps, for example 300 fs. The average power of input radiation IRD may be between 100 mW to several 100 W. The average power of input radiation IRD may for example be 20-50 W.

The pulsed pump radiation source PRS may be a laser. The spatio-temporal transmission characteristics of such a laser pulse, e.g. its spectral amplitude and phase, transmitted along the optical fiber OF can be varied and tuned through adjustment of (pump) laser parameters, working component WM variations, and optical fiber OF parameters. Said spatio-temporal transmission characteristics may include one or more of: output power, output mode profile, output temporal profile, width of the output temporal profile (or output pulse width), output spectral profile, and bandwidth of the output spectral profile (or output spectral bandwidth). Said pulse pump radiation source PRS parameters may include one or more of: pump wavelength, pump pulse energy, pump pulse width, pump pulse repetition rate. Said optical fiber OF parameters may include one or more of: optical fiber length, size and shape of the hollow core 101, size and shape of the capillaries, thickness of the walls of the capillaries surrounding the hollow core. Said working component WM, e.g. filling gas, parameters may include one or more of: gas type, gas pressure and gas temperature.

The broadband output radiation ORD provided by the radiation source RDS may have an average output power of at least 1 W. The average output power may be at least 5 W. The average output power may be at least 10 W. The broadband output radiation ORD may be pulsed broadband output radiation ORD. The broadband output radiation ORD may have a power spectral density in the entire wavelength band of the output radiation of at least 0.01 mW/nm. The power spectral density in the entire wavelength band of the broadband output radiation may be at least 3 mW/nm.

Figure 5:
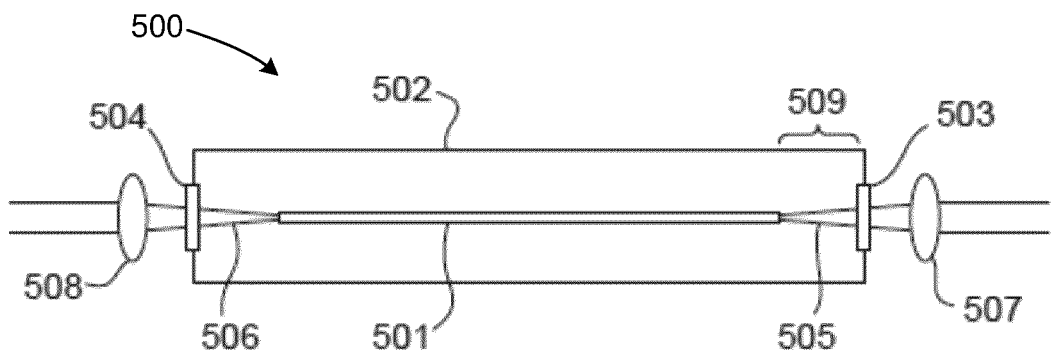
FIG. 5 depicts a schematic of a HC-PCF based light source with a gas cell.

FIG. 5 shows an example of a broadband light source apparatus comprising a HC-PCF. The light source 500 may comprise a gas cell 502 with an HC-PCF 501 embedded therein. Each of the two ends of the HC-PCF 501 may be optically coupled to a window 503/504, through which the input and output beams travel.

In use, the gas cell 502 may be filled with a gas (which may be a gas mix) and the HC-PCF 501 may be filled with the same or substantially similar gas. A gas flow may be established by providing a pressure difference between the input and output ends of the HC-PCF 501. Such a pressure in the gas cell or/and in the HC-PCF 501 may be the range 0.1-100 Bar. The gas cell may be composite.

An input source such as a pump laser enters the light source through input window 503. The beam of input light 506 is converged and enters the HC-PCF 501. The spectrum of the beam is broadened as it travels through the HC-PCF 501, yielding a broadband output beam 505.

A gap 509 is provided between the end facets of the HC-PCF and the windows to prevent dielectric breakdown of the windows, especially the output window. As shown in FIG. 5, broadband beam segment 505 diverges as it exits the HC-PCF output facet, such that the intensity of the beam once it reaches output window 503 is lower. Accordingly, the intensity of the beam impinging on the output window 503 is lower than the intensity threshold for dielectric breakdown of the window.

When operating a HC-PCF based light source, such as the light source 500, contaminants grow on the end facets of the HC-PCF over time. In particular, the present inventors have observed that contamination growths develop predominantly on the output facet of a HC-PCF. The growth of contamination appears to occur where the intensity of the light is highest, in particular, contamination growth is higher at the output facet of the HC-PCF than at the output window. Growth of contamination also appears to occur where the light has been spectrally broadened, in particular, contaminations do not grow as strongly on the input facet. In addition, contaminations are predominantly observed on the output facet of the of the HC-PCF, and not inside the HC-PCF itself.

The contaminants may develop due to silica particles being ablated from the windows of the gas cell, or from the HC-PCF. Contaminants may undergo a photo-induced process with the broadened output light from the PCF and change their chemical structure and/or crystallize on the output facet. After a certain amount of hours in operation (e.g., after a certain dose (J) of laser energy has been transmitted), this contamination results in the fiber's performance being degraded; this degradation may be referred to as the glassy growth phenomenon (GGP): e.g., $SiO_x$ structures growing at the output end of the fiber.

The buildup of these contaminants results in a decreased lifetime of the light source. GGP and the resultant contamination growths at the output facet can protrude into the optical path of the diverging beam. This causes scattering of the output light and thus leads to the decay of output power of the light source. GGP shortens the lifetime of the source: GGP causes light scattering and therefore the fiber loses its performance. This may result, for example, in the required photon budget for the sensor not being met after approximately 200 hours. Also, GGP causes drift of the light source power/spectral density and mode profile which, if unresolved, will require frequent re-calibrations. As such, the short lifetime of the fiber means frequent fiber swaps in the field, and might cause a very significant downtime (on the order of days) for the machine per year. This is not acceptable for an industrialized product.

Figure 6:
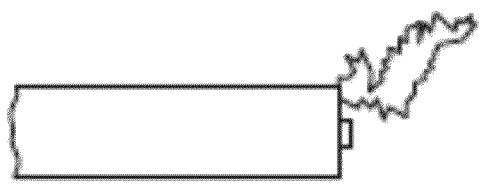
FIG. 6 depicts a schematic example of the end of a HC-PCF with a contamination growth.

FIG. 6 shows a schematic example of a contamination growth at the output end facet of a HC-PCF after an extended period of operation. To reduce these contamination growths and prolong the operational lifetime of an HC-PCF light source, it may be desirable to prevent formation of contaminants, reduce their concentration in the light source apparatus or to suppress contaminant-induced GGP growth. Possible techniques for reducing the concentration of contaminants and preventing their formation include rigorous cleaning of the gas environment and parts of the light generating cell/bulb prior to use in the light source. However, it is challenging to achieve sufficient cleaning with known cleaning methods, and not all contaminants can be avoided.

To describe a cause of GGP, a description as to how the anti-resonant fibers may be presently manufactured will be provided. The HC-PCF base material typically consists of pure, fused silica ($SiO_2$) HC-PCF. Geometrically a central hollow core is surrounded by a multitude of thin-wall anti-resonant fibers or tubes, e.g., ~170 nm wall thickness; e.g., arranged in an azimuthally uniform manner around the core. The core and the tubes may be enclosed in a fused silica jacket.

Figure 7:
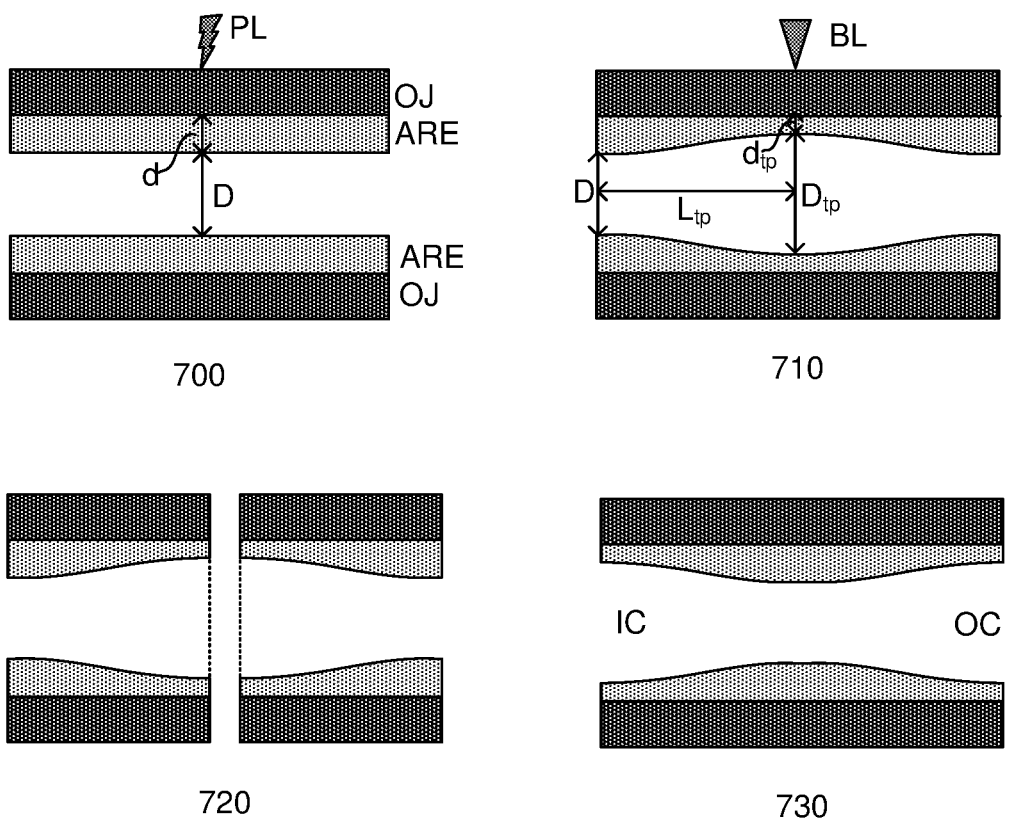
FIG. 7 depicts a hollow core fiber tapering and cleaving process according to a known method.

FIG. 7 illustrates the processes which may presently be used in forming the ends of a hollow core fiber or HC-PCF. The fiber may undergo a tapering and cleaving stage. Firstly, the fiber outer jacket OJ may be subjected to heat from a plasma discharge PL as illustrated at step 700, resulting in a partial collapse of the tube ARE under surface tension. The result of this can be seen in at step 710, where the tube ARE diameter reduces from a first diameter d to a smaller second diameter $d_{tp}$ over a fairly short tapering transition region of length $L_{tp} \leq$ Rayleigh length of the laser beam (a non-adiabatic taper). As such, the diameter D of the hollow core increases to diameter $D_{tp}$. The fiber is cleaved at or close to the waist of the tapered region by applying a sharp blade BL (e.g. a diamond blade) to the fiber jacket, resulting in two portions, shown at step 720, each comprising a clean, fresh $SiO_2$ surface. During the cleaving process, a small crack created by the blade BL, may be forced to propagate along a surface perpendicular to the fiber longitudinal axis by applying a mechanical stress/tension. The tapering and cleaving process can be repeated on the second end of the fiber to produce a double-sided tapered fiber having an in-coupling end IC and out-coupling end OC as illustrated in step 730 (of course the fiber section between the ends will be significantly longer in comparison). These ends typically may substantially have the same form and be interchangeable.

This process was originally developed for the in-coupling side of the fiber, to increase the damage threshold of the fiber by protecting it from high intensities in the focus of the input laser. In this case the capillaries are pushed away from the laser focus point, making the fiber more robust to beam pointing instabilities.

During the fiber lifetime, a growth of a glassy structure at the OC end tip of the fiber is observed. The growth is more pronounced at the sharp edges of the tubes and jacket at the end tip. Several factors contribute to this, some of which are related to structural defects in the fiber end. One such issue is surface reduction in the presence of atomic hydrogen. It is well know that silica glass can be reduced at relatively low temperatures (~100's of degrees centigrade) in the presence of atomic hydrogen according to the reaction: $SiO_2(s) + 4H \rightarrow Si(s) + 2H_2O(g)$. Molecular $H_2$ requires temperature in excess of 1000° C. to etch silica surface. Sources of $H_2$ include: $H_2$ deliberately added to the gas mixture (e.g., 2% $H_2$) which may be added to mitigate tube deformation, outgassing of water from the surfaces in the gas system and fiber surface itself, Hydrocarbons ($C_xH_y$) and impurities.

Defect centers and structural flaws (e.g. cleave and sharp edges) enhance surface reduction, e.g., by enhancing the production of atomic hydrogen. For example, defect centers act as "chemical centers" for production of atomic hydrogen: Cracking of molecular $H_2$ at defect sites with activation energy of 0.3-0.4 eV is a well-known phenomenon. An example is the reaction: $H_2 + Si(-O_3) \rightarrow H + HSi(-O_3)$ at a silicon dangling bond. Under controlled environment this could be used to passivate the dangling bonds. In an uncontrolled environment this reaction can be a source of atomic hydrogen. Also, defect centers form local hot spots (high temperature spots) at the interface of glass and gas. This provides or lowers the required activation energy for photo-dissociation of $H_2$ to atomic hydrogen. Defect centers enhance the local-electric field at the interface of glass and gas. This provides or lowers the required activation energy for photo-dissociation of $H_2$ to atomic hydrogen.

In addition, structural flaws enhance light absorption and multi-photon ionization in glass. This enhances surface reduction at local defects via an increase in the temperature and the atomic hydrogen concentration. It is known that glass behaves in a similar manner to a metal (absorbs light with wavelengths below 1 μm) at structural defects [for example, see Metallic-like photoluminescence and absorption in fused silica surface flaws, Ted A. Laurence et al., Applied Physics Letters 94, 151114 (2009); incorporated herein by reference]. This is attributed to increase in the defect centers at the local of structural flaws. Defect centers provide localized electrons. At these locations, the electronic structure of glass matrix (intrinsically a dielectric) is perturbed. In the presence of short wavelengths and high intensity light (i.e., a supercontinuum pulse), multi-photon absorption and avalanche ionization in glass promotes electrons from valance band to conduction band, forming an electron plasma at the surface of the glass. This enhances surface reduction by increasing the generation of atomic hydrogen. Plasma formation in transparent media under high-intensity light is a known effect and is used for creating metal-to-glass or glass-to-glass fusing. The electrons promoted to the conduction band within the duration of the supercontinuum pulse result in heating the glass and extreme heat generation at the defects and flaws.

The knowledge that the cleaving process is able to create an atomically smooth surface is based on the cleaving of crystals, and the inventors have observed that this is not directly generalizable to amorphous materials such as fussed silica used for fiber fabrication. With such amorphous materials, the cleaving procedure result in the fiber end being terminated abruptly and the consequential presence of (a) structural flaws and defects, e.g. sharp edges and a defect at the position of blade impact on the jacket, and (b) surface defects such as dangling bonds (NBOHC and E'-centers) at the surface. As has been explained, these become suitable centers for surface reduction and seeding the glassy growth. As such, the current post-processing step leaves the end tip of the fiber with a rough surface and sharp edges and with a large concentration of glass defects (e.g. dangling bonds). A modified end processing step is suggested to address these issues and control the glassy growth process at the end tips.

Therefore, an improved method for forming a tapered end of a hollow core fiber such as a HC-PCF is proposed. The main aim is to terminate the end tips of the fiber as smoothly as possible, therefore making the glass properties at the tips as similar as possible to bulk glass.

Figure 8:
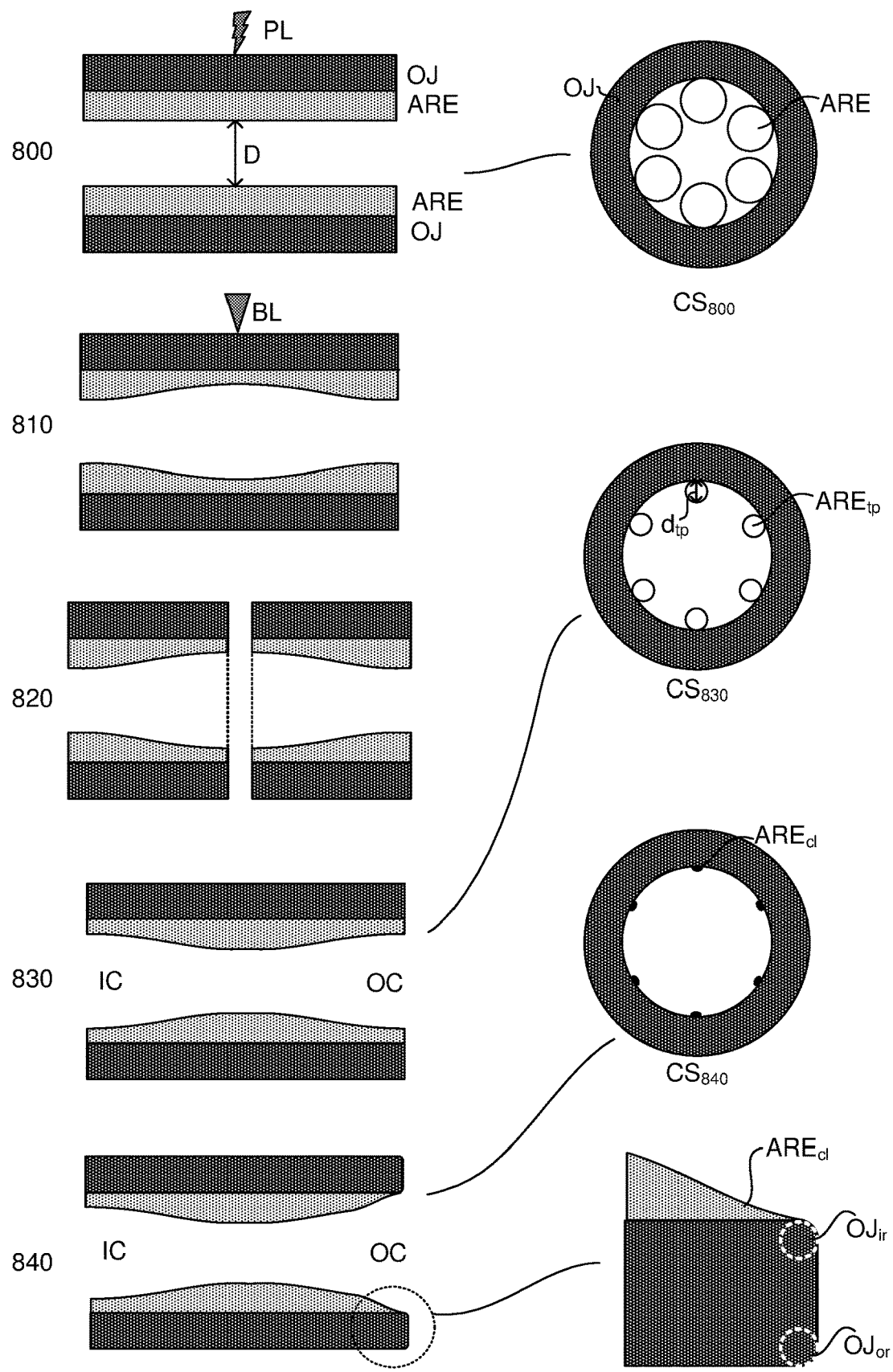
FIG. 8 depicts a hollow core fiber tapering and cleaving process according to an embodiment of the invention.

FIG. 8 is a schematic diagram of the modified processing procedure. The method may comprise preparing the fiber in the same manner as present, i.e. performing the tapering and cleaving steps illustrated in FIG. 7. As such, steps 700, 710, 720, 730 are essentially the same as steps 800, 810, 820, 830. In this example, the first tapering step 810 leaves the tubes partially open. As a result, as seen in the cross-section $CS_{830}$, the diameter $d_{tp}$ of the anti-resonance elements $ARE_{tp}$ of the tapered end is smaller than the diameter d of the anti-resonance elements ARE of the untampered fiber $CS_{800}$. This may be followed by a step 840 of heating the tip in a controlled manner; e.g., by fire-polishing or heat-polishing and smoothening of at least the out-coupling end OC. This heat-polishing and smoothening step 840 may be performed after the cleaving step 820 by applying, e.g., an additional electric arc (e.g., similar to the one used in the tapering step), laser radiation (e.g. a $CO_2$ laser) or a flame. The heat generated will result in a further collapse of the anti-resonance elements, e.g., such that they are substantially or fully collapsed $ARE_{cl}$ and the inner edge or inner rim $OJ_{ir}$ and/or outer edge or outer rim $OJ_{or}$ of the outer jacket are smoothened as can be seen in the cross section diagram $CS_{840}$ and Figure detail. Alternatively, the tapering step 810 prior to cleaving may be amended to substantially or fully collapse the anti-resonance elements ARE, with the heat-polishing and smoothening step 830 performed after this.

The smoothened inner rim $OJ_{ir}$ and/or outer rim $OJ_{or}$ may be such to round these rims such that one or both of these rims have a substantially (part) circular or elliptical profile. The rim or rim radius (e.g., the radii of the dotted white circles in the Figure) of these rims may be larger than 0.5 μm, larger than 2 μm or larger than 5 μm for example.

The collapsed tubes $ARE_{cl}$ may have an opening no larger than 10 μm, no larger than 5 μm, no larger than 2 μm or no larger than 1 μm in at least one dimension in the opening plane (perpendicular to the fiber axis).

In an embodiment, the length of the tapered section of the out-coupling side OC may be longer or shorter than that of the in-coupling side IC. Alternatively, the length of the tapered sections at the in- and out-coupling may be the same, but the tapered profile at the out-coupling side may be sharper (e.g., have a steeper gradient of the profile). As such, the process may result in an asymmetry between the in-coupling end IC and out-coupling OC end of the fiber. This is such that the anti-resonance elements ARE at the in-coupling IC end remain slightly open to counter-balance the positive gas pressure in the core.

The whole process may be performed in a protective atmosphere.

The method may comprise a final annealing step. As such, the process parameters (e.g., temperature, atmosphere composition and/or pressure, etc.) may be chosen to also provide an annealing of the glass, such that the whole fiber is annealed for removal of at last some remaining defects (i.e. dangling bonds) and residual stress. By way of example, the heat may be provided by a laser (e.g., a $CO_2$ laser) or a flame.

A lifetime test performed on an end-processed fiber disclosed herein shows an immediate improvement in lifetime. In particular no decay in the power spectral density in the 500-900 nm spectral range was observed over the duration of the test. This is the longest lifetime that has been observed for a fiber. A comparison between the glassy growth pattern for normal tapered fiber and the end-processed fiber shows that, for the end-processed fiber, the main growth on the tubes tips is completely eliminated, there being only a symmetric growth on the jacket inner rim observable. The growth pattern is also much smoother. The result is that total output power of light source using such a fiber shows a gradual decrease, at a much lower rate compared to a non-end-processed fiber based source.

Further embodiments are disclosed in the subsequent list of numbered clauses:

1. A method of processing an out-coupling end of a hollow core fiber comprising a plurality of anti-resonance elements surrounding a hollow core, comprising:
   performing a tapering step to form a taper in the anti-resonance elements;
   performing a cleaving step at said taper to form at least one tapered out-coupling end of the hollow core fiber; and
   performing an end processing step comprising further heating the out-coupling end in a controlled manner to smoothen the out-coupling end.
2. A method as defined in clause 1, comprising substantially collapsing the anti-resonance elements at the out-coupling end.

3. A method as defined in clause 2, wherein said collapsing of the anti-resonance elements is performed as part of the end processing step.
4. A method as defined in clause 2, wherein said collapsing of the anti-resonance elements is performed as part of the tapering step.
5. A method as defined in clause 2, 3 or 4, wherein the collapsing of the anti-resonance elements is such that each anti-resonance element has an opening at the out-coupling end no larger than 1 µm in at least one dimension in an output plane.
6. A method as defined in clause 2, 3 or 4, wherein the collapsing of the anti-resonance elements is such that each anti-resonance element has an opening at the out-coupling end no larger than 5 µm in at least one dimension in an output plane.
7. A method as defined in any of clauses 2 to 6, wherein the method comprises no equivalent collapsing step of the anti-resonance elements at an in-coupling end of the hollow core fiber.
8. A method as defined in any of clauses 2 to 7, wherein the collapsing step is such that the length of the taper at the out-coupling end is longer than a taper at the in-coupling end.
9. A method as defined in any of clauses 2 to 8, wherein the collapsing step is such that the profile of the taper at the out-coupling end has a steeper gradient than a taper at the in-coupling end.
10. A method as defined in any preceding clause, wherein said end processing step comprises heat-polishing and smoothening the out-coupling end.
11. A method as defined in clause 10, wherein the heat-polishing and smoothening step comprises applying one or more of: an electric arc, laser radiation or a flame to the out-coupling end.
12. A method as defined in any preceding clause, wherein the end processing step is such that a resultant smoothened inner rim and/or outer rim at the out-coupling end comprises a rounded profile.
13. A method as defined in clause 12, wherein the rounded profile of the inner rim and/or outer rim comprises a rim radius larger than 0.5 µm
14. A method as defined in clause 12, wherein the rounded profile of the inner rim and/or outer rim comprises a rim radius larger than 5 µm.
15. A method as defined in any preceding clause, comprising performing an annealing step to anneal the out-coupling end.
16. A method as defined in any preceding clause, wherein the hollow core fiber comprises a hollow-core photonic crystal fiber.
17. A hollow core fiber obtained by performance of the method of any preceding clause.
18. A hollow core fiber comprising:
a plurality of anti-resonance elements surrounding a hollow core;
an outer jacket surrounding the anti-resonance elements;
an in-coupling end having a first tapered region; and
an out-coupling end having a second tapered region;
wherein the anti-resonance elements at the out-coupling end are substantially collapsed; and the out-coupling end is substantially smoothed such that an inner rim and/or outer rim of the jacket comprises a rounded profile at the out-coupling end.
19. A hollow core fiber as defined in clause 18, wherein the rounded profile of the inner rim and/or outer rim comprises a rim radius larger than 0.5 µm
20. A hollow core fiber as defined in clause 18, wherein the rounded profile of the inner rim and/or outer rim comprises a rim radius larger than 5 µm.
21. A hollow core fiber as defined in any of clauses 18 to 20, wherein the each of said anti-resonance elements have an opening at the out-coupling end no larger than 1 µm in at least one dimension in an output plane.
22. A hollow core fiber as defined in any of clauses 18 to 20, wherein the each of said anti-resonance elements have an opening at the out-coupling end no larger than 5 µm in at least one dimension in an output plane.
23. A hollow core fiber as defined in any of clauses 18 to 22, wherein each of said anti-resonance elements have an opening at the in-coupling end which is larger than the opening at the out-coupling end.
24. A hollow core fiber as defined in any of clauses 18 to 23, wherein the length of the second tapered region is longer than the length of the first tapered region.
25. A hollow core fiber as defined in any of clauses 18 to 24, wherein the taper of the second tapered region has a steeper gradient than the taper of the first tapered region.
26. A hollow core fiber as defined in any of clauses 18 to 25, wherein the hollow core fiber comprises a hollow-core photonic crystal fiber.
27. A broadband light source device, being configured for generating a broadband output upon receiving pump radiation, comprising:
an optical component, comprising:
a hollow core fiber of any of clauses 18 to 26; and
a gas mixture filling said hollow core fiber.
28. A broadband light source as defined in clause 27, wherein the hollow core fiber is coupled to an optical source, the optical source comprising a pump laser.
29. A metrology device comprising the broadband light source of clause, wherein the light source is configured to generate light for projection onto a substrate.
30. The metrology device of clause 29, wherein the metrology device is one of: a scatterometer, an alignment sensor or a levelling sensor.

Although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, liquid-crystal displays (LCDs), thin film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist), a metrology tool and/or an inspection tool. Where applicable, the disclosure herein may be applied to such and other substrate processing tools. Further, the substrate may be processed more than once, for example in order to create a multi-layer IC, so that the term substrate used herein may also refer to a substrate that already contains one or multiple processed layers.

While specific embodiments of the invention have been described above, it will be appreciated that the invention may be practiced otherwise than as described.

The descriptions above are intended to be illustrative, not limiting. Thus it will be apparent to one skilled in the art that modifications may be made to the invention as described without departing from the scope of the claims set out below.

The invention claimed is:

1. A method of processing an out-coupling end of a hollow core fiber comprising a plurality of anti-resonance elements surrounding a hollow core, the method comprising:
    performing a tapering step to form a taper in the anti-resonance elements;
    performing a cleaving step at the taper to form at least one tapered out-coupling end of the hollow core fiber; and
    performing an end processing step comprising further heating the out-coupling end in a controlled manner to smoothen the out-coupling end.

2. The method as claimed in claim 1, comprising substantially collapsing the anti-resonance elements at the out-coupling end.

3. The method as claimed in claim 2, wherein the collapsing of the anti-resonance elements is performed as part of the end processing step, or is performed as part of the tapering step.

4. The method as claimed in claim 2, further comprising no equivalent collapsing step of the anti-resonance elements at an in-coupling end of the hollow core fiber.

5. The method as claimed in claim 2, wherein the collapsing of the anti-resonance elements is such that each anti-resonance element has an opening at the out-coupling end no larger than 1 μm in at least one dimension in an output plane.

6. The method as claimed in claim 2, wherein the collapsing step is such that the length of the taper at the out-coupling end is longer than a taper at the in-coupling end.

7. The method as claimed in claim 1, wherein the end processing step comprises heat-polishing and smoothening the out-coupling end.

8. The method as claimed in claim 1, comprising performing an annealing step to anneal the out-coupling end.

9. A hollow core fiber obtained by performance of the method of claim 1.

10. A hollow core fiber comprising:
    a plurality of anti-resonance elements surrounding a hollow core;
    an outer jacket surrounding the anti-resonance elements;
    an in-coupling end having a first tapered region; and
    an out-coupling end having a second tapered region,
    wherein the anti-resonance elements at the out-coupling end are substantially collapsed, and
    wherein the out-coupling end is substantially smoothed such that an inner rim and/or outer rim of the jacket comprises a rounded profile at the out-coupling end.

11. The hollow core fiber as claimed in claim 10, wherein the rounded profile of the inner rim and/or outer rim comprises a rim radius larger than 0.5 μm.

12. The hollow core fiber as claimed in claim 10, wherein each of the anti-resonance elements has an opening at the out-coupling end no larger than 1 μm in at least one dimension in an output plane.

13. The hollow core fiber as claimed in claim 10, wherein each of the anti-resonance elements has an opening at the in-coupling end which is larger than the opening at the out-coupling end.

14. The hollow core fiber as claimed in claim 10, wherein the length of the second tapered region is longer than the length of the first tapered region.

15. The hollow core fiber as claimed in claim 10, wherein the hollow core fiber comprises a hollow-core photonic crystal fiber.

16. A broadband radiation source device configured for generating a broadband radiation output upon receiving pump radiation, the broadband radiation source device comprising:
    an optical component, comprising:
        the hollow core fiber of claim 10; and
        a gas mixture filling the hollow core fiber.

17. A metrology device to determine a characteristic of a structure on a substrate, the metrology device comprising the broadband radiation source device of claim 16, wherein the broadband radiation source device is configured to generate radiation for projection onto the substrate.

18. The metrology device as claimed in claim 17, wherein the metrology device is a scatterometer, an alignment sensor or a levelling sensor.

19. The hollow core fiber as claimed in claim 10, wherein the rounded profile of the inner rim and/or outer rim comprises a rim radius larger than 5 μm.

20. The hollow core fiber as claimed in claim 10, wherein the taper of the second tapered region has a steeper gradient than the taper of the first tapered region.

* * * * *